United States Patent [19]
Ackermann

[11] Patent Number: 5,265,703
[45] Date of Patent: Nov. 30, 1993

[54] ADJUSTABLE HYDRAULIC VIBRATION DAMPER FOR MOTOR VEHICLES

[75] Inventor: Norbert Ackermann, Eitorf, Fed. Rep. of Germany

[73] Assignee: Boge Aktiengesellschaft, Eitorf, Fed. Rep. of Germany

[21] Appl. No.: 900,605

[22] Filed: Jun. 18, 1992

[30] Foreign Application Priority Data

Jul. 12, 1991 [DE] Fed. Rep. of Germany ....... 4123141

[51] Int. Cl.⁵ .................. B60G 17/08; F16F 9/46
[52] U.S. Cl. .................... 188/299; 188/315; 137/487.5
[58] Field of Search ............. 188/299, 313, 312, 311, 188/322.13, 314, 315, 322.17, 163, 164; 251/129.05; 137/487.5; 280/707, 714

[56] References Cited

U.S. PATENT DOCUMENTS

| | | | |
|---|---|---|---|
| 4,650,042 | 3/1987 | Knecht et al. | 188/299 |
| 4,696,379 | 9/1987 | Yamamoto et al. | 188/299 |
| 4,785,920 | 11/1988 | Knecht et al. | 188/299 |
| 4,850,460 | 7/1989 | Knecht et al. | 188/299 |
| 4,893,699 | 1/1990 | Engelsdorf et al. | 188/299 |
| 4,960,188 | 10/1990 | Wössner | 280/707 |
| 5,078,240 | 1/1992 | Ackermann et al. | 188/285 |
| 5,137,125 | 8/1992 | Troltsch et al. | 188/299 X |

FOREIGN PATENT DOCUMENTS

| | | | |
|---|---|---|---|
| 3434877 | 4/1986 | Fed. Rep. of Germany . | |
| 3605182 | 8/1987 | Fed. Rep. of Germany | 188/299 |
| 3712477 | 10/1987 | Fed. Rep. of Germany . | |
| 4016807 | 1/1991 | Fed. Rep. of Germany . | |
| 3936453 | 5/1991 | Fed. Rep. of Germany | 188/299 |
| 0030541 | 2/1983 | Japan | 188/299 |
| 2223822 | 4/1990 | United Kingdom | 188/299 |

Primary Examiner—Robert J. Oberleitner
Assistant Examiner—Peter M. Poon
Attorney, Agent, or Firm—Nils H. Ljungman & Associates

[57] ABSTRACT

A hydraulic, adjustable vibration damper has an electromagnetically activated damping valve to at least partly control the damping force. In the electromagnet of the damping valve, the base of the armature guide and the end surface of the armature adjacent to the base are configured so that there is at least one recess in one of the parts, into which at least one recess, at least one correspondingly configured extension on the other part projects. With this configuration, the electromagnet is able to attain high forces, largely independent of the distance, over a short work stroke of the armature of the electromagnet.

20 Claims, 6 Drawing Sheets

ADJUSTABLE HYDRAULIC VIBRATION DAMPER FOR MOTOR VEHICLES

BACKGROUND OF THE INVENTION

1. Field of the Invention

This invention relates to an adjustable hydraulic vibration damper having a piston fastened to a piston rod. The piston divides a work cylinder of the vibration damper into two work chambers, which chambers can be filled with damping fluid. To at least partly control the damping force of the vibration damper, an electromagnetically activated damping valve controls passage of fluid between the chambers. The damping valve can have a coil, a magnetic armature, a valve body connected to the armature and a valve seat. The coil and magnetic armature make up an electro-magnet which has, in its range of operation, an armature guide made of soft magnetic material, which armature guide surrounds the armature.

2. Background Information

Known vibration dampers, such as the vibration damper disclosed in German Patent No. 37 12 477, which corresponds to U.S. Pat. No. 4,850,460, include hydraulic, adjustable vibration dampers in which an electromagnetically activated damping valve controls a flow passage for the damping fluid. The damping valve is equipped with an electromagnet and an armature, or a magnetic armature, connected to a valve body. The electromagnet thereby has a magnetic armature designed as a flat armature. Such a design results in an electromagnet whose attractive force decreases over the stroke according to an E-function, i.e. the electromagnet has a very high holding force, but only a low attractive force.

Other types of vibration dampers, such as those dampers disclosed by German Laid Open Patent Applications No. 34 34 877 and No. 40 16 807, which correspond to U.S. Pat. Nos. 4,650,042 and 5,078,240, respectively, also include hydraulically adjustable vibration dampers. These vibration dampers have a damping valve which is equipped with an electromagnet, whereby the electromagnet is designed as a shunt magnet. With such a shunt magnet, there is a cone opposite the magnetic armature, whereby the magnetic armature itself can be conical in its upper portion as disclosed in German Laid Open Patent Application No. 34 34 877, or cylindrical as disclosed in German Laid Open Patent Application No. 40 16 807. As a result of a magnetic flux exiting laterally between the magnetic armature and the shunt edge, there is a significant increase in the magnetic force in the range of attraction compared to flat armature models as disclosed by German Patent No. 37 12 477. The proportion of the axial magnetic flux decreases correspondingly over the stroke, which is reflected in a reduction of the holding force.

Electromagnets in shunt configurations are typical for proportional magnets, whereby the magnet, depending on the shape of the shunt, achieves a force proportional to the current over the work stroke of approximately 2 mm, which force is practically independent of the distance. Electromagnetically adjustable, hydraulic vibration dampers, in particular damping systems operated at high pressure, must have a high magnetic force. If, as a function of the application, forces which are independent of distance are also required with a short work stroke, the effect of a shunt configuration of the prior art is not sufficient to achieve the typical proportional magnetic action. The effect of the magnetic cross flux in the shunt area is then too small, and it is no longer possible to achieve a constant force over the work stroke.

OBJECT OF THE INVENTION

The object of the invention is to create an electromagnet for an electromagnetically activated damping valve of a vibration damper, so that high magnetic forces, which are largely independent of the distance, can be achieved over a short work stroke of the armature.

SUMMARY OF THE INVENTION

This object is achieved by the invention in that the base of the armature guide and the end surface of the armature adjacent to the base are designed so that, in one of the parts, there is a recess having at least one lateral surface running parallel to the center axis of the armature, and in the other part there is a correspondingly designed raised extension that preferably projects into this recess.

One advantage of this solution is that a short-stroke electromagnet is created, whose usable shunt length is increased as a result of achieving a higher cross flux corresponding to the axial magnetic flux component. As a result of the recess provided either in the base or in the armature, into which recess the extension of the other part projects, a shunt length is created which is greater than the circumference of the magnetic armature. In this manner, the usable shunt length can be at least almost doubled, and in spite of the small stroke, the electromagnet exhibits a force action proportional to the current which is practically independent of the distance.

In one configuration of the invention, the raised extension can be a circular ring-shaped projection and the recess can be a circular ring-shaped groove, or the raised extension can be a circular projection and the recess can be a circular groove.

An additional essential characteristic of the invention is that there are at least two recesses, into which a corresponding number of raised extensions project. In such a case it is advantageous that the shunt length can be multiplied without additional effort.

In an additional embodiment, the recess and the extension can have a cross section which is not circular.

One embodiment which can be advantageous in terms of manufacturing characteristics is that the armature guide surrounding the armature can preferably be designed in two parts. In such a case, the armature guide can be separable from the base of the armature guide and thus can be manufactured separately and easily, by using suitable fabrication measures.

In an additional advantageous embodiment, the inner shunt can be designed as a cone.

One aspect of the invention resides broadly in a hydraulic, adjustable vibration damper for a motor vehicle, the damper having a hydraulic cylinder filled with damping fluid. The damper comprises: a piston device for being disposed in the hydraulic cylinder to divide the hydraulic cylinder into two chambers, the piston device comprising a piston fastened to a piston rod; a first attachment device for attaching the hydraulic cylinder to one of a frame and a wheel suspension of the motor vehicle, and a second fastening device for attaching the piston rod to the other of the frame and the wheel suspension; a flow passage connecting each of the two chambers to provide fluid communication between the two chambers; an electromagnetic valve apparatus for controlling flow of fluid between each of the two chambers; and a device for electrically connecting the electromagnetic valve apparatus to an external power source, whereby a damping force of the damper is externally adjustable by energization of the electromagnetic valve apparatus. The electromagnetic valve apparatus comprises: a magnetic circuit, the magnetic circuit comprising: a magnetic armature movable between a first position and a second position, the armature having a first end surface and a second end surface opposite the first end surface, and a magnetic base; a coil of wire wrapped about at least a portion of the magnetic circuit; a valve body disposed at the second end of the magnetic armature; a valve seat disposed adjacent the valve body, the valve body being movable towards and away from the valve seat to close and open the flow passage upon movement of the magnetic armature from the first position to the second position; at least one of: the first end surface of the armature, and the base having at least one recess, the at least one recess having at least one first surface angularly disposed with respect to the at least one of the first end surface and the base; and the other of: the first end surface of the armature, and the base comprising at least one corresponding projection for being inserted into the at least one recess, the at least one corresponding projection having at least one second surface for being disposed adjacent the at least one first surface of the at least one recess.

Another aspect of the invention resides broadly in a hydraulic, adjustable vibration damper, the damper comprising: a work cylinder; a piston dividing the work cylinder into a first chamber and a second chamber, each of the first and second chamber having damping fluid therein; a flow passage connecting the first chamber to the second chamber; and an electromagnetic valve apparatus for controlling flow of the fluid between the first chamber and the second chamber. The electromagnetic valve apparatus comprises: a magnetic circuit, the magnetic circuit comprising a magnetic armature movable between a first position and a second position, the armature having a first end surface and a second end surface opposite the first end surface, and a base, the first end surface of the armature for being disposed adjacent the base; a coil of wire wrapped about at least a portion of the magnetic circuit; a valve body connected to the second end of the armature; a valve seat disposed adjacent the valve body, the valve body being movable towards and away from the valve seat to close and open the flow passage upon movement of the magnet armature from the first position to the second position; at least one of: the first end surface of the armature, and the base having at least one recess, the at least one recess having at least one first surface angularly disposed with respect to the at least one of the first end surface and the base; and the other of: the first end surface of the armature, and the base comprising at least one corresponding projection for being inserted into the at least one recess, the at least one corresponding projection having at least one second surface for being disposed adjacent the at least one first surface of the at least one recess.

One additional aspect of the invention resides broadly in a hydraulic, adjustable vibration damper, the damper comprising: a work cylinder; a piston dividing the work cylinder into a first chamber and a second chamber, each of the first and second chamber having damping fluid therein; a flow passage connecting the first chamber to the second chamber; and an electromagnetic valve device for controlling flow of the fluid between the first chamber and the second chamber. The electromagnetic valve device comprising: a magnetic circuit, the magnetic circuit comprising: a magnetic armature movable between an extended position and a contracted position, the armature having a first end surface and a second end surface opposite the first end surface; and a base, the first end surface of the armature for being disposed adjacent the base; a coil of wire wrapped about at least a portion of the magnetic circuit; a valve body connected to the second end of the armature; a valve seat disposed adjacent the valve body, the valve body being movable towards and away from the valve seat to close and open the flow passage upon movement of the magnetic armature from the extended position to the contracted position, the first end surface of the magnetic armature in the extended position being disposed spaced apart from the base; the first end surface of the magnetic armature in the contracted position being disposed adjacent the base; and the first end surface and the base having overlapping portions adjacent to one another in the extended position thereby providing a path of low magnetic reluctance between the first end surface and the base.

BRIEF DESCRIPTION OF THE DRAWINGS

Preferred embodiments of the invention are schematically illustrated in the accompanying drawings, in which.

DESCRIPTION OF THE PREFERRED EMBODIMENTS

Figure 1:
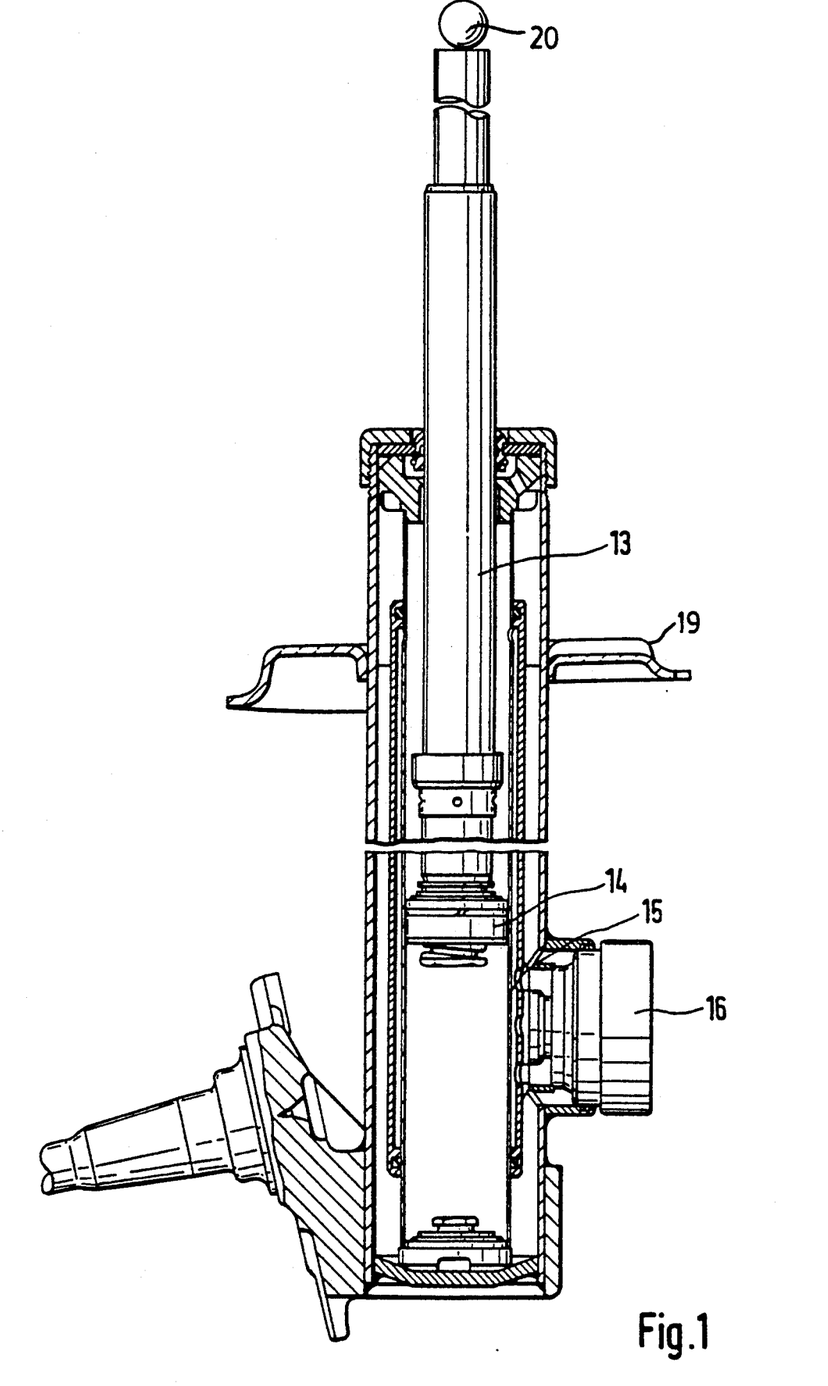
FIG. 1 shows, in cross section, a vibration damper with an electromagnetically activated damping valve.

FIG. 1 shows a hydraulic, adjustable vibration damper as one possible embodiment, whereby a work piston 14 fastened to a piston rod 13 divides a work cylinder 15 into two work chambers that can be filled with damping fluid. There can preferably be an electromagnetically activated damping valve 16 to control the damping force. The damper can have first and second attachment devices 19 and 20 to fasten the damper between the frame of the motor vehicle and a wheel suspension of the motor vehicle.

Figure 2:
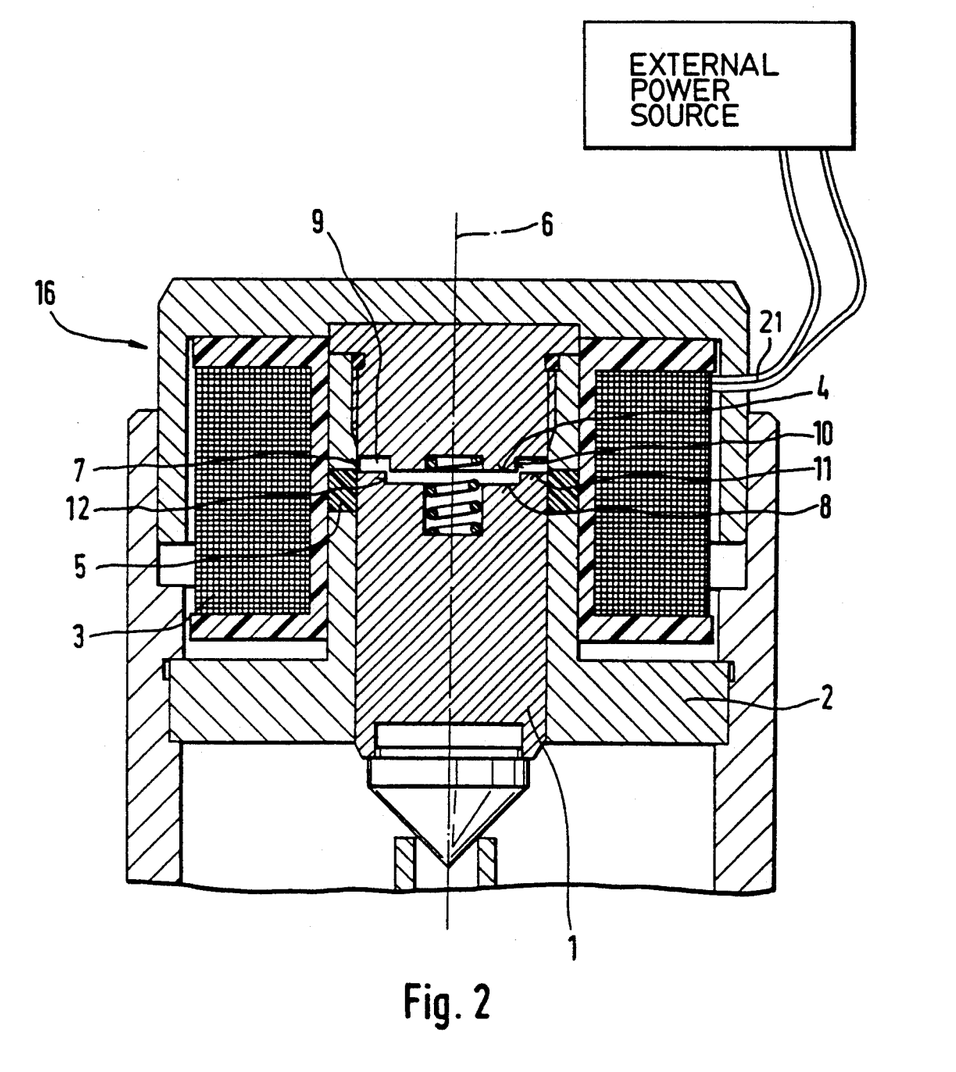
FIG. 2 shows, in cross section, a detail of an electromagnetic damping valve.

FIG. 2 shows a detail of one embodiment of an electromagnetically activated damping valve 16. The electromagnetically activated damping valve can preferably have a coil 3, a magnet armature 1 enclosed in an armature guide 2, and a non-magnetic insulation ring 5. Electric current can be conducted to the coil by means of the wire leads 21 which can be connected to a power supply. The ring 5 together with the armature guide 2 essentially form a lateral surface, or shunt 7. In the base 4 of the armature guide 2 there can preferably be a recess 9, into which recess 9 the extension 11 of the end surface 8 of the armature 1 can project. The lateral surfaces 12 of the recess 9 and of the extension 11 can preferably be oriented parallel to the center axis 6, and can form a second shunt 10.

Figure 3:
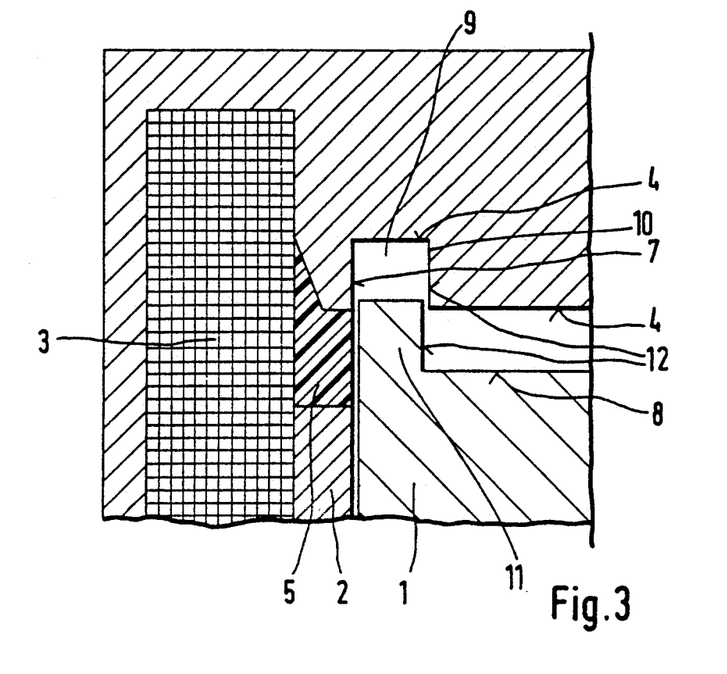
FIG. 3 shows a detail of a magnet armature with an armature guide.

FIG. 3 shows, on an enlarged scale, an illustration of another embodiment of the armature 1 whereby the end surface 8 of the armature is shown having an extension 11. This extension 11 can project into a corresponding recess 9 in the base 4 of the armature guide 2, and thus the one shunt 7 of the armature guide 2 can be disposed outside of the armature 1 and the second shunt 10 of the base 4 can be disposed inside of the armature 1. The non-magnetic insulation ring 5, as shown in FIG. 3, can have a conical surface, and thus, the inner shunt 7 would also resemble a cone.

When the extension 11 is substantially extended out of the recess 9, the magnetic reluctance can generally be kept low in the magnetic circuit because of the close proximity of the lateral surfaces, or shunts 7, with the corresponding extension 11. For this reason, the magnetic flux for a given number of ampere turns can generally be kept high.

Figure 4:
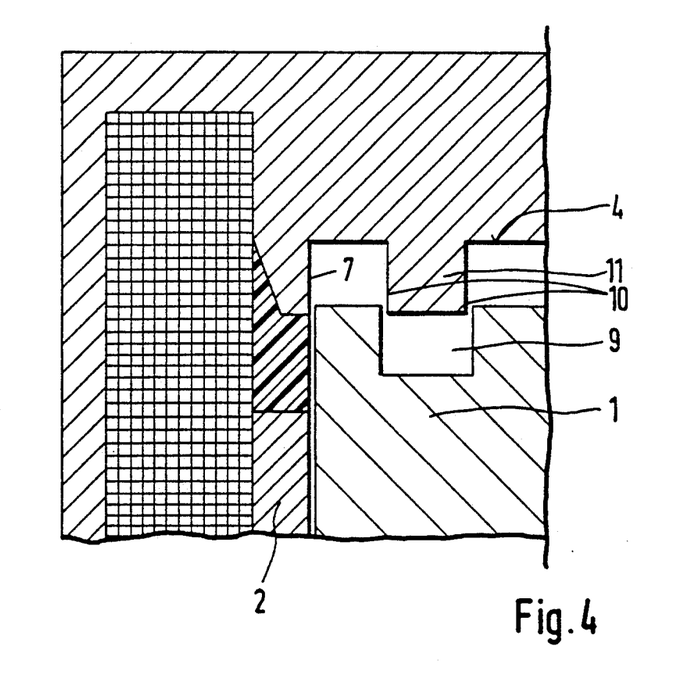
FIGS. 4 to 8 show, in cross section, additional embodiments of the magnet armature and the armature guide.
Figure 5:
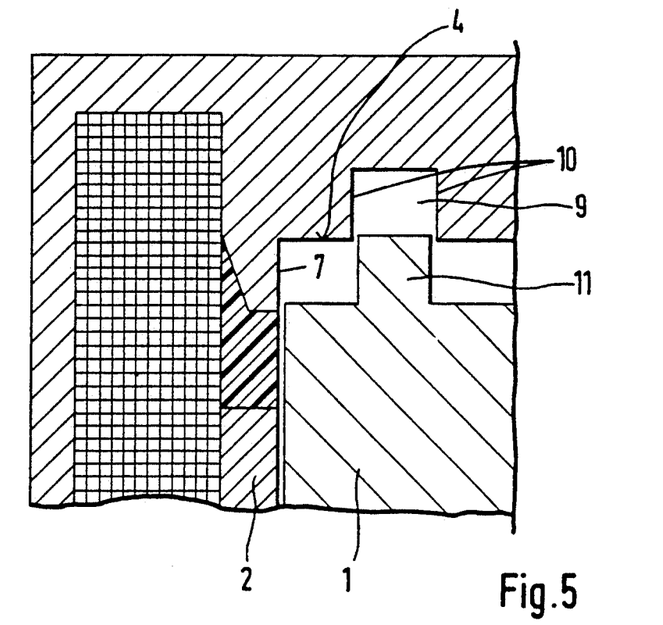

An additional embodiment of the armature 1 is illustrated in FIG. 4. As shown in FIG. 4, the armature 1 can have a ring-shaped recess 9, into which recess 9 the extension 11 of the base 4 of the armature guide 2 can project. With this configuration, there are essentially three shunts, the outer shunt 7 and the two inner shunts 10. The shunt length can thus effectively be tripled by this configuration. As shown in FIG. 5, the shunt length can also be tripled by a configuration in which the armature 1 has an extension 11, and the base 4 of the armature guide 2 has a corresponding recess 9.

Figure 6:
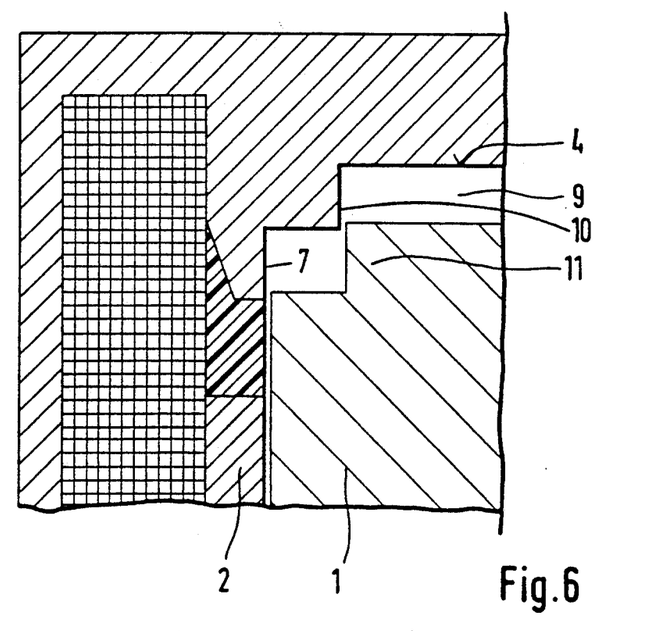

FIG. 6 shows a nearly doubled shunt length provided by the outer shunt 7 and the single inner shunt 10. In this configuration, the armature 1 is shown as having a central, circular extension 11. This central extension 11, when the armature 1 executes an inward axial movement, can project into a circular recess 9 on the base 4 of the armature guide 2.

Figure 7:
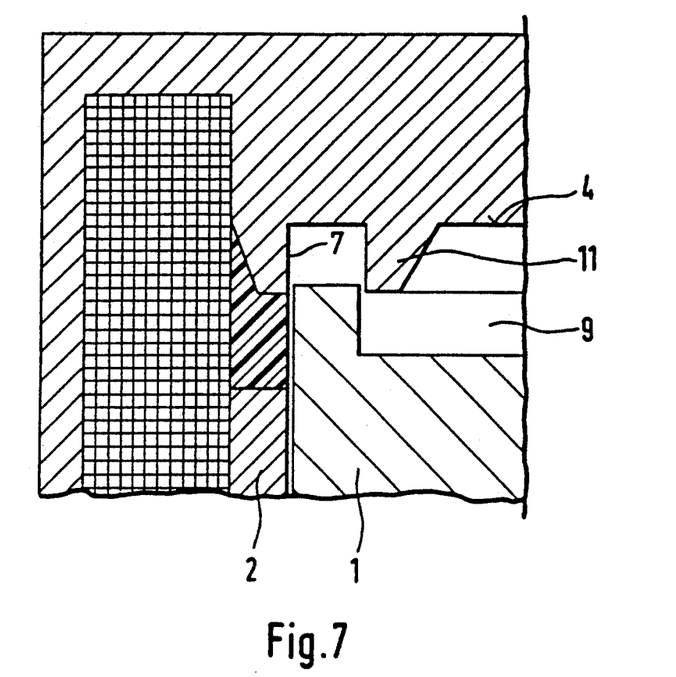

FIG. 7, shows an additional embodiment, in which the shunt 7 has a conical cross section, and in which a surface of extension 11 is also conical. As shown in this embodiment, the extension 11, which can be located on the base 4, can project into a corresponding recess 9 of the armature 1.

Figure 8:
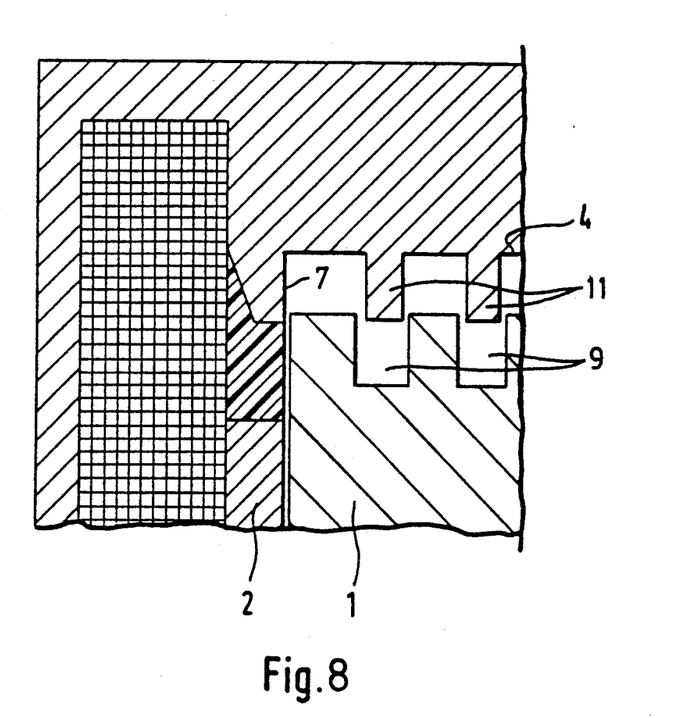
Figure 9:
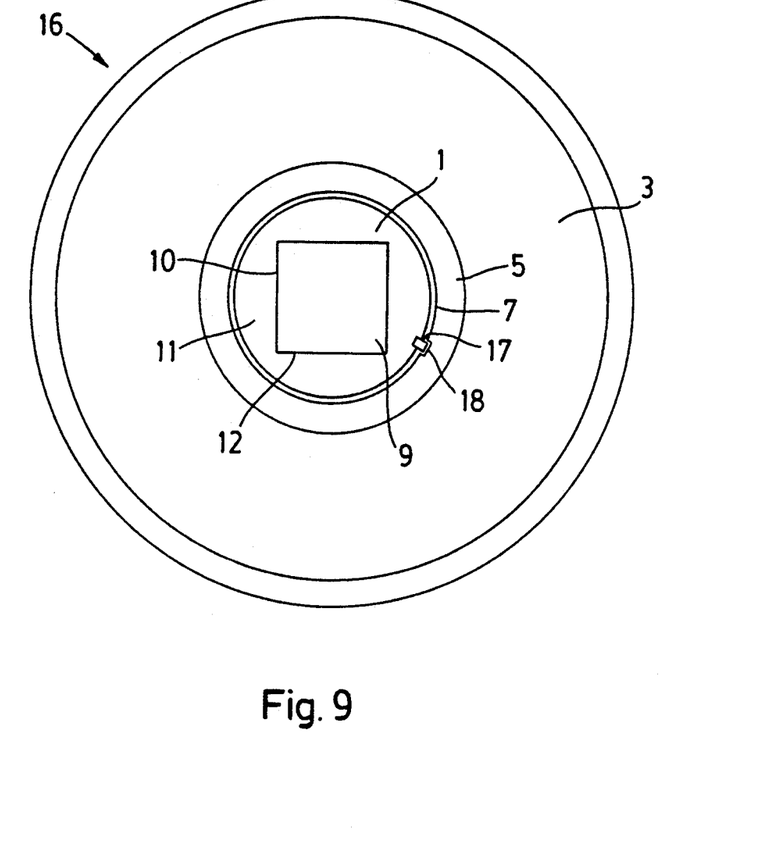
FIG. 9 shows an overhead view of the end surface of an armature having a non-circular recess.

A number of other possible configurations for the recesses 9 and the extensions 11 can also be used depending on the magnetic forces desired. One such configuration, as shown in FIG. 8, could include at least two extensions 11 which could project into at least two corresponding recesses 9, thereby increasing the shunt length by a factor of at least about five times. Also, non-circular extensions 11 and recesses 9 could be used as shown in FIG. 9. However, with non-circular recesses, proper alignment of extensions and recesses would essentially need to be maintained. For this purpose, a guide 17 could be provided on one of the surface of the armature 1 or the surface of the armature guide 2. This guide 17 could fit within a guide groove 18 on the other of the two surfaces, thereby essentially inhibiting any twisting motion of the armature 1 within the armature guide 2 that would result in a loss of alignment between the non-circular extensions 11 and recesses 9.

One feature of the invention resides broadly in a hydraulic, adjustable vibration damper with a piston fastened to a piston rod, which piston divides a work cylinder into two work chambers filled with damping fluid, whereby at least partly to control the damping force, an electromagnetically activated damping valve, consisting of a coil, a magnet armature, a valve body connected to the armature and a valve seat, controls a flow passage, whereby the electromagnet, in its range of activity, has an armature guide made of soft magnetic material surrounding the armature, characterized by the fact that the base 4 of the armature guide 2 and the end surface 8 of the armature 1 adjacent to the base 4 are designed so that in one of the parts 4 or 8, there is at least one recess 9 having a lateral surface 12 which runs parallel to the center axis 6 of the armature 1, into which recess a correspondingly configured raised extension 11 of the other part 4 or 8 projects.

Another feature of the invention resides broadly in a vibration damper characterized by the fact that the raised extension 11 is a circular ring-shaped projection and the recess 9 is a circular ring-shaped groove.

Yet another feature of the invention resides broadly in a vibration damper characterized by the fact that the raised extension 11 is a circular projection and the recess 9 is a circular groove.

Still another feature of the invention resides broadly in a vibration damper characterized by the fact that there are at least two recesses 9, into which a corresponding number of raised extensions 11 project.

Another feature of the invention resides broadly in a vibration damper characterized by the fact that the recess 9 and the extension 11 have a cross section which is not circular.

Yet another feature of the invention resides broadly in a vibration damper characterized by the fact that the armature guide 2 surrounding the armature 1 is designed in two parts.

Still another feature of the invention resides broadly in a vibration damper characterized by the fact that the inner shunt 7 is designed as a cone.

All, or substantially all, of the components and methods of the various embodiments may be used with at least one embodiment or all of the embodiments, if any, described herein.

All of the patents, patent applications and publications recited herein, if any, are hereby incorporated by reference for non-essential subject matter as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydraulic, adjustable vibration damper for a motor vehicle, said damper having a hydraulic cylinder filled with damping fluid, and said damper comprising:
   piston means for being disposed in said hydraulic cylinder to divide said hydraulic cylinder into two chambers, said piston means comprising a piston fastened to a piston rod;
   first attachment means for attaching said hydraulic cylinder to one of a frame and a wheel suspension of the motor vehicle, and second fastening means for attaching the piston rod to the other of the frame and the wheel suspension;
   a flow passage connecting each of said two chambers to provide fluid communication between said two chambers;
   electromagnetic valve means for controlling flow of fluid between each of said two chambers; and means for electrically connecting said electromagnetic valve means to an external power source, whereby a damping force of said damper is externally adjustable by energization of said electromagnetic valve means;

said electromagnetic valve means comprising:
  a magnetic circuit, said magnetic circuit comprising:
    a magnetic armature movable between a first position and a second position, the armature having a first end surface and a second end surface opposite said first end surface;
    a magnetic base, said first end surface of said armature for being disposed adjacent said base;
    said magnetic base disposed about at least a portion of said armature, said magnetic base having a longitudinal axis, and said magnetic armature being movable within the magnetic base in a direction parallel to said longitudinal axis,
    said magnetic base comprising means for guiding said armature within said magnetic base;
    said magnetic base comprising:
      a wall portion disposed about said at least a portion of the armature;
    said wall portion comprising:
      a first wall part disposed adjacent said first end of said armature, said first wall part comprising magnetic material;
      a ring of non-magnetic material disposed generally about said first end of said armature adjacent said first wall part;
      said base comprising a second wall part disposed adjacent said ring of non-magnetic material, said second wall part comprising magnetic material;
  a coil of wire wrapped about at least a portion of said magnetic circuit;
  a valve body disposed at said second end of said magnetic armature;
  a valve seat disposed adjacent said valve body, said valve body being movable towards and away from the valve seat to close and open the flow passage upon movement of said magnetic armature from said first position to said second position;
  at least one of:
    said first end surface of said armature, and said base
    having at least one recess, the at least one recess having at least one first surface angularly disposed with respect to said at least one of said first end surface and said base; and
  the other of:
    said first end surface of the armature, and said base
    comprising at least one corresponding projection for being inserted into said at least one recess, said at least one corresponding projection having at least one surface for being disposed adjacent the at least one first surface of said at least one recess;
  said first wall part defining a first magnetic path for shunting magnetic flux between said magnetic base and said armature; and
  said second wallpart;

defining at least one additional magnetic path for shunting magnetic flux between said magnetic base and said armature.

2. The vibration damper according to claim 1, wherein:
  said first and second wall parts comprise a soft magnetic material.

3. The vibration damper according to claim 2, wherein:
  said first surface of said recess and a second surface of said at least one surface of said projection are disposed parallel to the longitudinal axis; and
  said at least one projection comprises at least one circular ring-shaped projection and said at least one recess comprises at least one circular ring-shaped groove.

4. Vibration damper according to claim 3, wherein said at least one recess comprises two circular ring-shaped grooves, and said at least one corresponding projection comprises two circular ring shaped projections.

5. The vibration damper according to claim 2, wherein:
  said first surface of said recess and a second surface of said at least one surface of said projection are disposed parallel to the longitudinal axis; and
  said at least one projection comprises a circular projection and said at least one recess comprises a circular recess.

6. Vibration damper according to claim 2, wherein said at least one projection and said at least one recess have a cross section which is non-circular.

7. Vibration damper according to claim 2, wherein:
  said non-magnetic ring comprises an at least partially conical end surface disposed adjacent said first wall part;
  said first wall part comprises an at least partially conical end surface corresponding to the at least partially conical end surface of the non-magnetic ring;
  said first surface of said recess and a second surface of said at least one surface of said projection are disposed parallel to the longitudinal axis; and
  said at least one projection comprises at least one circular ring-shaped projection and said at least one recess comprises at least one circular ring-shaped groove.

8. A hydraulic, adjustable vibration damper, said damper comprising:
  a work cylinder;
  a piston dividing the work cylinder into a first chamber and a second chamber, each of said first and second chamber having damping fluid therein;
  a flow passage connecting said first chamber to said second chamber; and
  electromagnetic valve means for controlling flow of the fluid between said first chamber and said second chamber, said electromagnetic valve means comprising:
    a magnetic circuit, said magnetic circuit comprising:
      a magnetic armature movable between a first position and a second position, the armature having a first end surface and a second end surface opposite said first end surface;
      a magnetic base, said first end surface of said armature for being disposed adjacent said base;

said magnetic base disposed about at least a portion of said armature, said magnetic base having a longitudinal axis, and said magnetic armature being movable within the magnetic base in a direction parallel to said longitudinal axis, said magnetic base comprising means for guiding said armature within said magnetic base;

said magnetic base comprising:
  a wall portion disposed about said at least a portion of the armature; said wall portion comprising:
  a first wall part disposed adjacent said first end of said armature, said first wall part comprising magnetic material;
  a ring of non-magnetic material disposed generally bout said first end of said armature adjacent said first wall part;

said base comprising a second wall part disposed adjacent said ring of non-magnetic material, said second wall part comprising magnetic material;

a coil of wire wrapped about at least a portion of said magnetic circuit;

a valve body connected to said second end of said armature;

a valve seat disposed adjacent said valve body, said valve body being movable towards and away from the valve seat to close and open the flow passage upon movement of said magnet armature from said first position to said second position;

at least one of:
  said first end surface of said armature, and said base
  having at least one recess, the at least one recess having at least one first surface angularly disposed with respect to said at least one of said first end surface and said base; and the other of:
  said first end surface of the armature, and said base
  comprising at least one corresponding projection for being inserted into said at least one recess, said at least one corresponding projection having at least one second surface for being disposed adjacent the at least one first surface of said at least one recess;

said first wall part defining a first magnetic path for shunting magnetic flux; and said second wall part defining at least one additional magnetic path for shunting magnetic flux.

9. The vibration damper according to claim 8, wherein:
said non-magnetic ring comprises an at least partially conical end surface adjacent said first wall portion;
said first wall part comprises an at least partially conical end surface corresponding to the at least partially conical end surface of the non-magnetic ring.

10. The vibration damper according to claim 9, wherein:
said first surface of said recess and said second surface of said projection are disposed parallel to the longitudinal axis; and
said at least one projection comprises at least one circular ring-shaped projection and said at least one recess comprises at least one circular ring-shaped groove.

11. Vibration damper according to claim 10, wherein said at least one recess comprises two circular ring-shaped grooves, and said at least one corresponding projection comprises two circular ring shaped projections.

12. The vibration damper according to claim 9, wherein:
said first surface of said recess and said second surface of said projection are disposed parallel to the longitudinal axis; and
said at least one projection comprises a circular projection and said at least one recess comprises a circular recess.

13. Vibration damper according to claim 9, wherein said at least one projection and said at least one recess have a cross section which is non-circular.

14. Vibration damper according to claim 9, wherein:
said magnetic base comprises a soft magnetic material;
said coil of wire is disposed about said magnetic base;
said first surface of said recess and said second surface of said projection are disposed parallel to the longitudinal axis; and
said at least one projection comprises at least one circular ring-shaped projection and said at least one recess comprises at least one circular ring-shaped groove.

15. A hydraulic, adjustable vibration damper, said damper comprising:
a work cylinder;
a piston dividing the work cylinder into a first chamber and a second chamber, each of said first and second chamber having damping fluid therein;
a flow passage connecting said first chamber to said second chamber; and
electromagnetic valve means for controlling flow of the fluid between said first chamber and said second chamber, said electromagnetic valve means comprising:
a magnetic circuit, said magnetic circuit comprising:
  a magnetic armature movable between an extended position and a contracted position, the armature having a first end surface and a second end surface opposite said first end surface;
  a magnetic base, said first end surface of said armature for being disposed adjacent said base;
  said magnetic base disposed about at least a portion of said armature, said magnetic base having a longitudinal axis, and said magnetic armature being movable within the magnetic base in a direction parallel to said longitudinal axis,
  said magnetic base comprising means for guiding said armature within said magnetic base;
  said magnetic base comprising:
    a wall portion disposed about said at least a portion of the armature;
    said wall portion comprising:
      a first wall part disposed adjacent said first end of said armature, said first wall part comprising magnetic material;
      a ring of non-magnetic material disposed generally about said first end of said armature adjacent said first wall part;
    said base comprising a second wall part disposed adjacent said ring of non-magnetic material, said second wall part comprising magnetic material;

a coil of wire wrapped about at least a portion of said magnetic circuit;

a valve body disposed at said second end of said magnetic armature;

a coil of wire wrapped about at least a portion of said magnetic circuit;

a valve body connected to said second end of said armature;

a valve seat disposed adjacent said valve body, said valve body being movable towards and away from the valve seat to close and open the flow passage upon movement of said magnet armature from said extended position to said contracted position;

said first end surface of said magnetic armature in said extended position being disposed spaced apart from said base;

said first end surface of said magnetic armature in said contracted position being disposed adjacent said base;

said first end surface and said first wall part having a first set of overlapping portions adjacent to one another in the extended position thereby providing a first path of low magnetic reluctance between said first end surface and said first wall part; and said first end surface and said base having at least one additional set of overlapping portions adjacent to one another in the extended position thereby providing at least one additional path of low magnetic reluctance between said first end surface and said base.

16. The vibration damper according to claim 15, wherein:

said at least one additional set of overlapping portions comprise at least one projection on at least one of said first end surface and said base, and at least one corresponding recess on the other of said first end surface and said base;

said first and second wall parts comprise a soft magnetic material.

17. The vibration damper according to claim 16, wherein:

said overlapping portions are disposed parallel to the longitudinal axis; and said at least one projection comprises at least one circular ring-shaped projection and said at least one recess comprises at least one circular ring-shaped groove.

18. Vibration damper according to claim 16, wherein:

said non-magnetic ring comprises an at least partially conical end surface; and said base comprises an at least partially conical end surface corresponding to the at least partially conical end surface of the non-magnetic ring.

19. The vibration damper according to claim 18, wherein:

said overlapping portions are disposed parallel to the longitudinal axis; and said at least one projection comprises a circular projection and said at least one recess comprises a circular recess.

20. Vibration damper according to claim 16, wherein said at least one projection and said at least one recess have a cross section which is non-circular.

* * * * *

UNITED STATES PATENT AND TRADEMARK OFFICE
CERTIFICATE OF CORRECTION

PATENT NO. : 5,265,703
DATED : November 30, 1993
INVENTOR(S) : Norbert ACKERMANN It is certified that error appears in the above-indentified patent and that said Letters Patent is hereby corrected as shown below:

In Column 9, lines 16-17, Claim 8, after 'generally', delete "bout" and insert --about--.

Signed and Sealed this

Twelfth Day of September, 1995

Attest:

BRUCE LEHMAN

Attesting Officer  Commissioner of Patents and Trademarks